United States Patent [19]
Alford, Jr.

[11] 3,970,332
[45] July 20, 1976

[54] AIRLINE TICKET AND INFORMATION FOLDER

[75] Inventor: Lauritz Lauritzen Alford, Jr., Dallas, Tex.

[73] Assignee: Ad-One, Inc., Dallas, Tex.

[22] Filed: Nov. 14, 1974

[21] Appl. No.: 523,906

[52] U.S. Cl. .................................. 281/31; 283/56; 40/104.03; 40/124.1
[51] Int. Cl.² ...................................... B42D 15/00
[58] Field of Search .................... 150/39, 38, 35; 40/10 B, 10 D, 159, 124.2, 104.19, 104.03, 124.1; 206/459, 37, 39, 39.7, 40; 282/25; 283/23, 33, 34, 35, 56; 281/31; 35/44

[56] References Cited
UNITED STATES PATENTS

| | | | |
|---|---|---|---|
| 1,450,335 | 4/1923 | Sharp | 283/35 |
| 1,558,898 | 10/1925 | Ledine | 283/23 |
| 2,732,874 | 1/1956 | Carstensen | 150/39 |

FOREIGN PATENTS OR APPLICATIONS

| | | | |
|---|---|---|---|
| 226,861 | 7/1959 | Australia | 282/25 |

OTHER PUBLICATIONS
Triptik from The American Automobile Association, copyright 1971.

*Primary Examiner*—Robert W. Michell
*Assistant Examiner*—V. Millin
*Attorney, Agent, or Firm*—Richards, Harris and Medlock

[57] ABSTRACT

The specification discloses an airline travel ticket and information folder for use by an airline passenger. The folder includes a pocket portion formed by a pair of flexible paper sheets to enable the insertion of tickets and boarding passes therein. A first fold panel is integrally joined by a first fold to one edge of the pocket portion. A plurality of additional fold panels are integrally joined together by folds to the first fold panel. On the front of the fold panels, indicia provides travel information related to the destination of the airplane. On the back of the fold panels, advertisements are displayed which are related to the indicia formed on adjacent fold panels. A map of the city of destination is provided on at least one of the fold panels and is color coded relative to certain of the travel information contained on the fold panels. The fold panels are constructed to be folded together beneath the pocket portion to form a compact folder for the airline passenger.

11 Claims, 7 Drawing Figures

AIRLINE TICKET AND INFORMATION FOLDER

FIELD OF THE INVENTION

The invention relates fo folders, and more particularly relates to an airplane ticket and information folders for use by airplane passengers.

THE PRIOR ART

It is common practice for commercial airlines to provide ticket folders to airline passengers prior to boarding. Generally, such ticket folders include a pocket for receiving a ticket or a boarding pass, along with a single fold panel which may be folded adjacent to the pocket portion. Flight information is generally written on the front of the folder to inform the passenger of the flight number, destination, gate, time of departure, and the like. Such previously developed folders have primarily served as a package for the ticket and boarding pass, but have not provided the passenger with meaningful information relating to accommodations, restaurants, or other travel information relating to the city of destination.

SUMMARY OF THE INVENTION

In accordance with the present invention, a travel ticket and information folder is provided which provides a package for tickets and boarding passes, and which additionally provides a wealth of travel information for the passenger regarding the city of destination, such as information regarding the location and type of hotels, restaurants and entertainment.

In accordance with a specific aspect of the present invention, a travel ticket and information folder is provided for use by a passenger and includes a pocket portion formed by a pair of adjacently disposed flexible sheets joined together about a plurality of edges. Two edges of the sheets are unjoined to enable the insertion of ticket or boarding documents into the pocket formed by the sheets. A first fold panel is integrally joined by a first fold to one edge of the pocket portion. At least one additional fold panel is adjacently disposed to the first fold panel on the side opposite the pocket portion. Indicia providing information related to the destination of the passenger is located on at least one of the first or additional fold panels. The first and additional fold panels are adapted to be folded together beneath the pocket portion to form a compact folder for carrying by the passenger.

In accordance with yet another aspect of the invention, an airplane ticket and information folder is provided for use by an airplane passenger. The folder includes a rectangular pocket portion formed by a pair of flexible paper sheets to enable the insertion of tickets and boarding passes therein. A first fold panel is integrally joined by a first fold to one edge of the pocket portion and includes travel information regarding the destination of a passenger. A plurality of additional fold panels are interconnected by folds to the first fold panel and bear on the front sides thereof additional travel information regarding the destination of a passenger. Ones of the additional fold panels display on the back sides thereof advertisements related to the travel information contained on the front sides of adjacent fold panels, such that the fold panels may be folded to place the advertisements adjacent pertinent travel information. The fold panels are constructed to be folded beneath the pocket portion to form a compact folder for carrying while being adaptable to be unfolded when the passenger desires to review travel information regarding the destination of the airplane.

In accordance with yet a more specific aspect of the invention, an airline ticket and information folder includes a pocket portion formed by a pair of flexible paper sheets joined together by a plurality of edges. Certain edges of the sheets are unjoined to enable the insertion of ticket or boarding documents into the pocket formed by the sheets. Areas are displayed on the front of the pocket portion for receiving flight information. Indicia is formed on the back of the pocket portion which relates to services provided by the airline. A first fold panel is integrally joined by a first fold to one edge of the pocket portion and includes on the front side thereof a first type of travel information relating to the city of destination. A second fold panel is integrally joined by a second fold to one edge of the first fold and includes on the front side thereof a second type of travel information relating to the city of destination. A third fold panel is integrally joined by the third fold to one edge of the second fold and includes on the front side thereof a third type of travel information relating to the city of destination. A fourth fold panel is integrally joined by a fourth fold to one edge of the third panel. A fifth fold panel is integrally joined by a fifth fold to one edge of the fourth panel. The fourth and fifth panels include on the front side thereof a map of the city of destination. Advertising is displayed on the back sides of each of the fold panels such that as the fold panels are folded, the advertising is disposed adjacent a related type of travel information. The folds are oriented such that the fold panels may be folded beneath the pocket portion to form a compact folder.

DESCRIPTION OF THE DRAWINGS

For a more complete understanding of the present invention and for further objects and advantages thereof, reference is now made to the following description taken in conjunction with the accompanying drawings, in which.

DESCRIPTION OF THE PREFERRED EMBODIMENT

Figure 1:
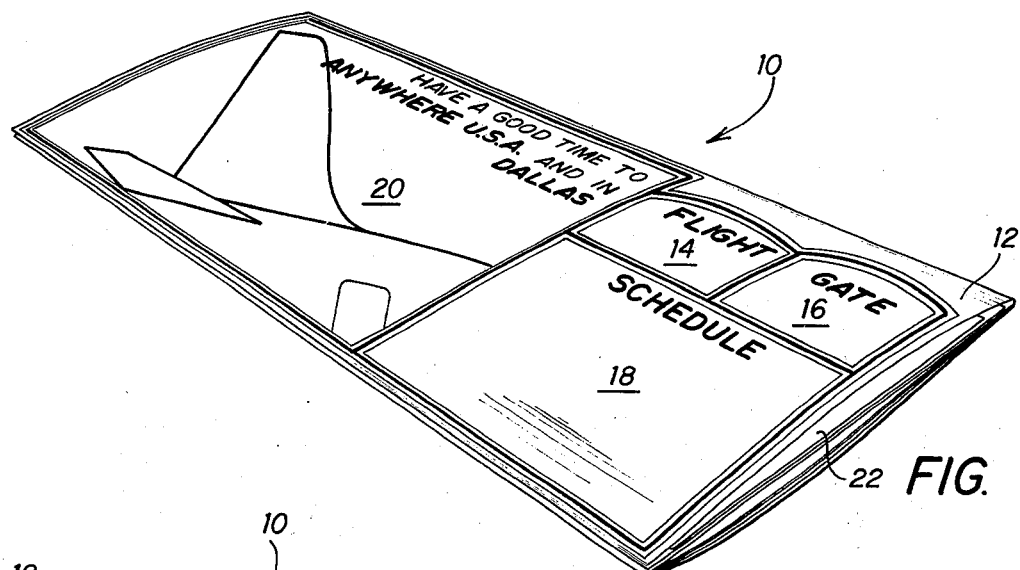
FIG. 1 is a perspective view of the travel ticket and information folder of the invention shown in the folded configuration.

FIG. 1 illustrates the airline ticket and information folder of the present invention as identified generally by the numeral 10. Folder 10 is illustrated as being folded into a compact folder for insertion into the coat pocket or purse of an airline passenger. A pocket portion 12 forms the top portion of the folder, with the front of the pocket including space and indicia 14 to enable flight information to be written in, space and indicia 16 to enable departure gate information enable be written in, and space and indicia 18 to enaable schedule information to be written in. An advertisement 20 for the airline covers the remainder of the front of the pocket portion 12. A boarding pass or ticket 22 may be inserted into the pocket portion in the well-known manner.

Figure 2:
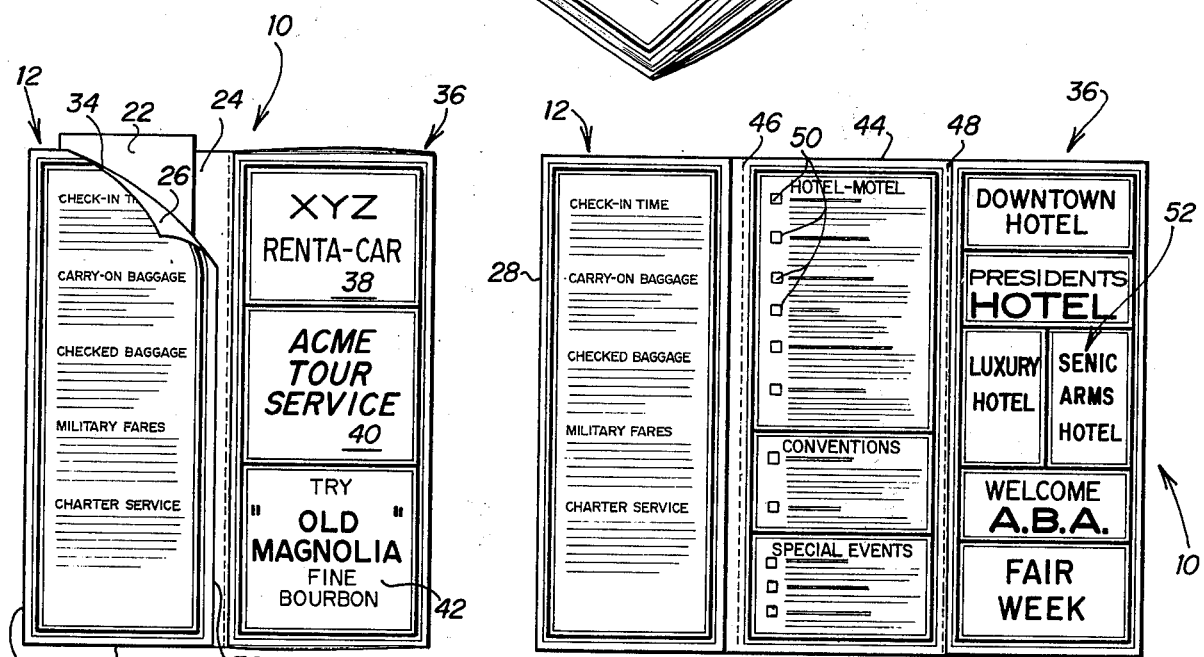
FIG. 2 is a front view of the folder shown in FIG. 1 illustrating the pocket portion and the folded panels attached thereto.

FIG. 2 illustrates the folder 10 opened to expose the backside of the pocket portion 12 and to show the boarding pass or ticket 22 inside the pocket portion 12. As shown, the pocket portion 12 comprises a pair of adjacently disposed rectangular flexible sheets of paper 24 and 26 joined together about edges 28 and 30. Sheets 24 and 26 are not joined about edges 32 and 34 to thereby form a pocket for receipt of the boarding pass or ticket 22 in the well-known manner. Information regarding various services provided by the airline, such as check-in service, how to carry on baggage, military affairs and the like, are printed on sheet 26.

An important aspect of the present invention is the provision of a plurality of fold panels 36 which are integrally connected to the pocket portion 12 by folds in order to provide travel information to the passenger regarding the city of destination. As shown in FIG. 2, the back of the visible rectangular fold panel contains general advertisements 38, 40 and 42.

Figure 3:
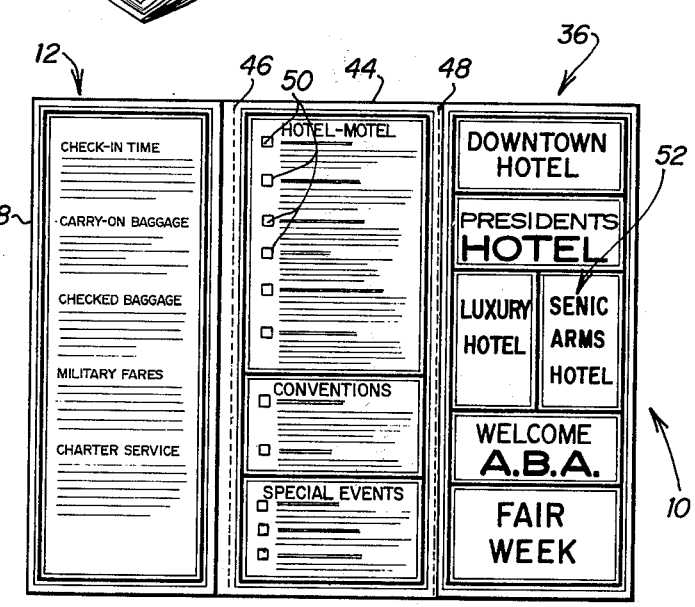
FIG. 3 illustrates the folder of FIG. 2 with two of the fold panels being unfolded.

When the fold panels are unfolded as shown in FIG. 3, the first fold panel 44 is exposed to view. As shown in FIG. 3, it may be seen that first fold panel 44 is integrally joined to the pocket portion 12 by a first fold 46 illustrated by a dotted line. The first fold panel 44 is connected by a fold 48 to the remainder of the fold panels 36.

The first fold panel 44 contains information regarding hotels and motels located in the city of destination of the flight. Such information may include, for example, the address of various hotels and motels, rates, and other information important to the traveler to enable the choosing of suitable lodging. Blocks 50 are located adjacent each designated hotel or motel, with each of the blocks 50 being color coded according to the location of the hotel or motel on the map to be subsequently described. In addition, travel information regarding conventions and special events in the city of destination are provided on the first fold panel 44. In this manner, the passenger is provided with ready reference to valuable travel information by merely folding out the folded portion of the folder.

Another important aspect of the present invention is that the backside 52 of the fold panel adjacent the first fold panel 44 is provided with advertisements relating to hotels, motels, conventions and special events set forth on the first fold panel 44. In this way, the passenger may obtain additional information regarding the travel information displayed on the fold panel 44.

Figure 4:
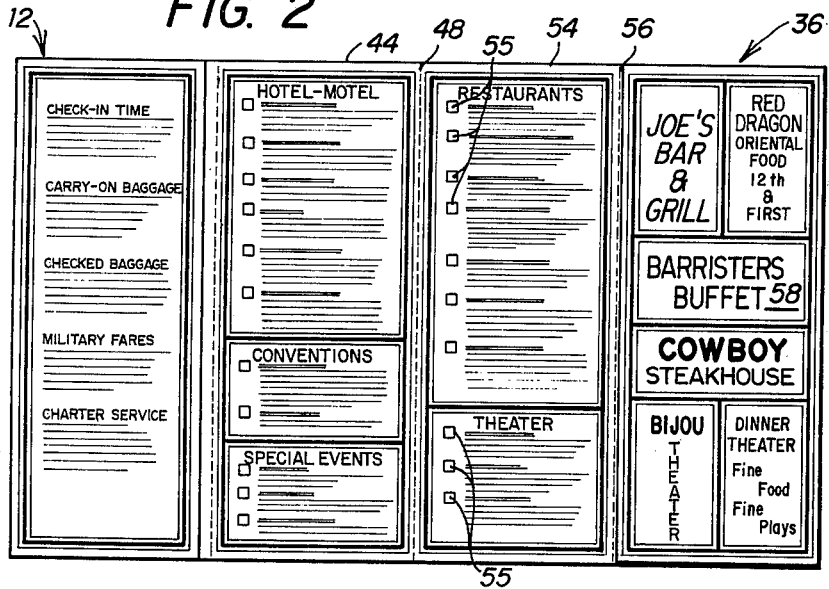
FIG. 4 illustrates the folder shown in FIG. 3 with an additional fold panel being unfolded.

FIG. 4 illustrates the folder 10 of the invention when the second fold panel 54 is exposed to view by further outward folding of the fold panels 36. As shown, the second fold panel 54 is integrally joined by fold 48 to the first fold panel 44. In addition, the second fold panel 54 is joined by a fold 56 to the remainder of the fold panels 36. Travel information regarding restaurants and theaters are displayed on the second fold panel 54. For example, information regarding the location of various restaurants in the city of destination, along with price and types of food, may be provided on the panel 54. In addition, information regarding location and prices of theaters may also be displayed on the panel 54. Blocks 55 of coded colors are provided adjacent the restaurants and theaters to enable general location of the restaurants or theaters on a color coded map to be subsequently described.

An important aspect of the present invention is that the back 58 of the fold panel adjacent the second fold panel 54 in this position contains advertisements regarding various restaurants and theaters enumerated on panel 54. In this manner, due to the folding construction of the folder 10, advertisements directly related to the enumerated restaurants and theaters are directly provided for the convenience of the passenger.

Figure 5:
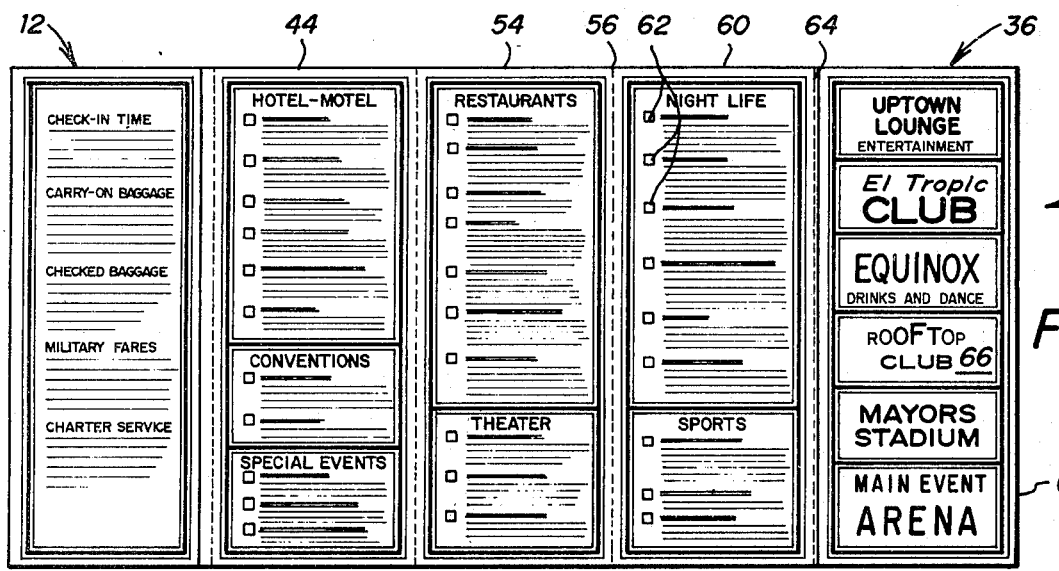
FIG. 5 illustrates the folder as shown in FIG. 4 with an additional fold panel being unfolded.

FIG. 5 illustrates further unfolding of the folder 10 to visually expose the third fold panel 60. As shown in FIG. 5, the third fold panel 60 contains information regarding entertainment such as night life and sports. As before, blocks 62 are provided with predetermined colors in order to enable the passenger to identify the general location of the entertainment relative to a map to be subsequently described.

The third fold panel 60 is joined to the second fold panel 54 by a fold 56 and is joined by a fold 64 to the remaining two fold panels 36. An important aspect of the invention is that the back 66 of the fold panel adjacent panel 60 contains advertisements relating to night life or sports. In this manner, the passenger is able to obtain additional information regarding night life or sports by referring directly to the advertisements which are located in the most convenient location possible.

Figure 6:
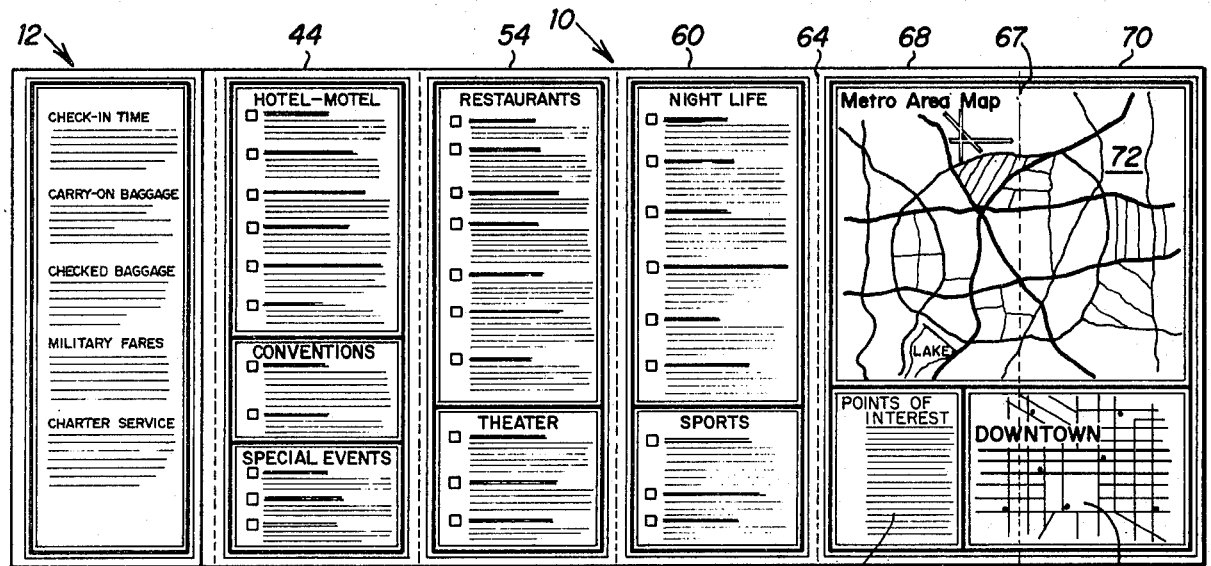
FIG. 6 illustrates the folder as shown in FIG. 5 with the folder being completely unfolded.

FIG. 6 illustrates the present folder 10 in its completely unfolded position, wherein the fourth fold panel 68 and the fifth fold panel 70 are exposed to view. As seen, fold panels 68 and 70 have displayed thereon a map 72 of the city of destination of the passenger. An area 74 including points of interest, and an enlarged section of the downtown area 76, are also printed on panels 68 and 70. The panel 68 is joined to panel 60 by the fold 64, with panels 68 and 70 being joined together by a fold 67.

An important aspect of the present invention is that the map 72 is provided with a plurality of colors, with each color representing a different section of the city. These colors are displayed on various ones of the blocks 50, 55 and 62 in order to enable the passenger to determine generally the location within the city of the various establishments of interest. While it will be understood that a wide variety of color combinations can be used, in the preferred embodiment, the city is broken up into six equal areas, with each area being given a distinct color.

Figure 7:
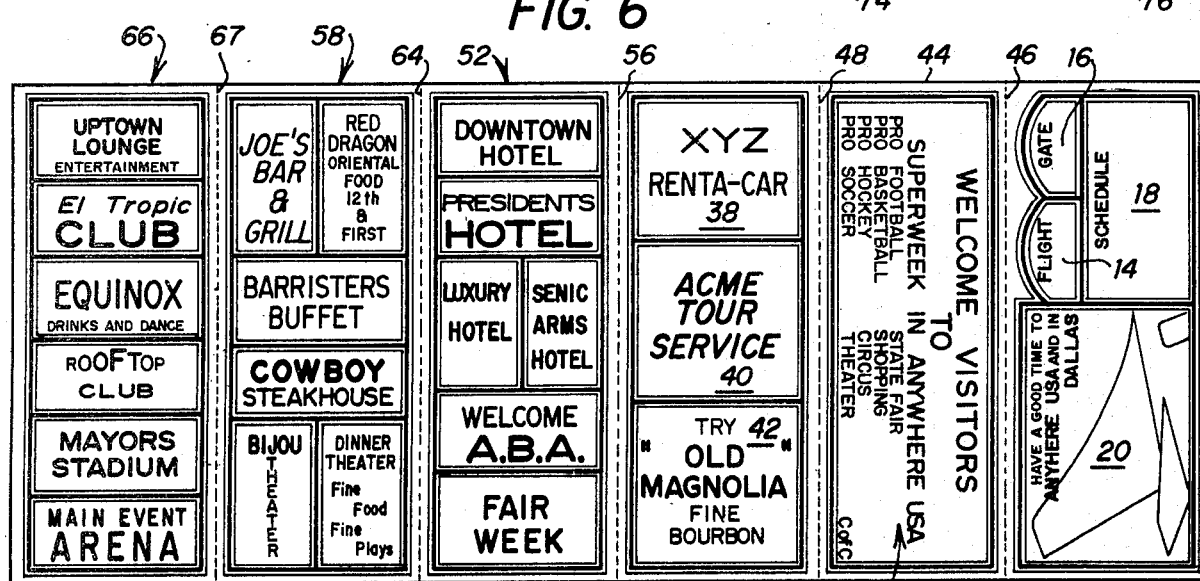
FIG. 7 illustrates the back side of the folder shown in FIG. 6.

FIG. 7 illustrates the backside of the unfolded folder 10 shown in FIG. 6. The advertisements contained on the back of the various panels have previously been described, with the exception of the general advertisements 80 which appear on the back of the first fold panel 44.

Each of the folds 46, 48, 56, 64 and 67 are constructed such that when the map is fully expanded in the open position as shown in FIG. 6, folding of the most righthand fold panel will cause the most righthand fold panel to be folded on top of the adjacent panel. In this manner, the map may be folded according to the folding steps shown in FIGS. 6, 5, 4, 3, 2, and 1 to form the compact ticket and boarding pass folder 10 as shown in FIG. 1.

The present folder may thus be seen to provide distinct advantages for both the airline and for the passenger. The airline is able, through advertising sold and displayed on the folder 10, to provide an inexpensive ticket folder to the passenger. For the passenger, a wealth of travel information is provided to enable meaningful decisions to be made as to lodging, restaurants and the like. The additional travel information provided to the passenger is provided without substantially increasing the bulkiness of the folder, as the present folder occupies substantially the same space as do conventional ticket folders. The use of the present folder by an airline provides good public relations to the airline at little extra expense due to the advertisements in the folder. In addition, the airline is provided with important advertising, as it is likely that passengers will keep the folder due to the information contained therein.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. An airplane ticket and information folder for use by an airplane passenger comprising:
   a rectangular pocket portion formed by a pair of flexible paper sheets to enable the insertion of tickets and boarding passes therein,
   a first paper panel integrally joined by a first paper fold to one edge of said pocket portion and including a first type of travel information regarding the destination of the passenger,
   a plurality of additional paper fold panels, said panels having a first edge and a second edge opposite said first edge, the first panel of said additional paper fold panels being connected along its first edge by a fold to the edge of said first fold panel opposite said first fold with the remaining said fold panels being connected with the first edge of each said panel connected by a fold to the second side of an adjacent panel,
   ones of said additional fold panels displaying on the back sides thereof advertisements regarding the travel information contained on the front side of the fold panel once removed from the panel adjacent thereto, such that said fold panels may be folded to place said advertisements on the back of said fold panels in a side-by-side relationship adjacent corresponding types of travel information on the front of said fold panels as said fold panels are sequentially folded one upon the other,
   said fold panels being constructed to be folded beneath said pocket portion to form a compact folder for carrying, while being operable to be unfolded when the passenger desires to review travel information regarding the destination.

2. The airplane ticket and information folder of claim 1 and further comprising:
   a map of the city of destination of the passenger formed on at least one of said fold panels.

3. The airplane ticket and information folder of claim 2 wherein said map is coded with color as to preselected areas, said travel information on said fold panels being color coded in order to be related to said preselected areas on said map.

4. The airplane ticket and information folder of claim 2 wherein said travel information comprises information regarding the location and description of hotels and restaurants.

5. An airline ticket and information folder comprising:
   a pocket portion formed by a pair of flexible paper sheets joined together about a plurality of edges, edges of said sheets being unjoined to enable the insertion of ticket or boarding documents into the pocket formed by said sheets,
   areas displayed on the front of said pocket portion for receiving flight information,
   indicia on the back of said pocket portion relating to services provided by the airline,
   a first fold panel integrally joined by a first fold to one edge of said pocket portion and including on the front side thereof a first type of travel information relating to the city of destination,
   a second fold panel integrally joined by a second fold to the edge of said first fold panel opposite said first fold and including on the front side thereof a second type of travel information relating to the city of destination,
   a third fold panel integrally joined by a third fold to the edge of said second fold panel opposite said second fold and including on the front side thereof a third type of travel information relating to the city of destination and on the back side thereof a first type of advertising corresponding to said first type of travel information on said first fold panel such that said first type of advertising may be positioned in a side-by-side relation adjacent said first type of travel information on the front side of said first panel by folding said third fold panel along the third fold over said second fold panel.

6. The folder of claim 5 further comprising:
   a fourth fold panel joined by a fourth fold to the edge of said third fold panel opposite said third fold and including on the front side thereof a fourth type of travel information relating to the city of destination and on the back side thereof a second type of advertising corresponding to said second type of travel information on said second fold panel such that said second type of advertising may be positioned in a side-by-side relation adjacent said second type of travel information on the front side of said second fold panel by folding said fourth fold panel along the fourth fold over said third fold panel.

7. The folder of claim 6 further comprising:
   a fifth fold panel joined by a fifth fold to the edge of said fourth fold panel opposite said fourth fold and including on the front side thereof a fifth type of travel information relating to the city of destination and on the back side thereof a third type of advertising corresponding to said third type of travel information on said third fold panel such that said third type of advertising may be positioned in a side-by-side relation adjacent said third type of travel information on the front side of said third fold panel by folding said fifth fold panel along the fifth fold over said fourth fold panel.

8. The folder of claim 7 wherein one of said types of travel information and corresponding advertising is directed to hotels.

9. The folder of claim 8 wherein one of said types of travel information and corresponding advertising is directed to restaurants.

10. The folder of claim 9 wherein one of said types of travel information and corresponding advertising is directed to entertainment.

11. The folder of claim 10 wherein one of said types of advertising is a map of the city of destination with colors on said map related to color indicia adjacent said travel information.

* * * * *

UNITED STATES PATENT OFFICE
CERTIFICATE OF CORRECTION

Patent No. 3,970,332  Dated July 20, 1976

Inventor(s) Lauritz Lauritzen Alford, Jr.

It is certified that error appears in the above-identified patent and that said Letters Patent are hereby corrected as shown below:

Column 1, line 5, "fo" should read -- to --.

Column 3, line 1, delete "enable" at the end of the printed line and insert -- to --; line 2, "enaable" should read -- enable --. Column 5, line 63, "The airplane ticket and information folder of claim 2" should read -- The airline ticket and information folder of claim 1 --.

*Signed and Sealed this*

Twenty-first *Day of* September 1976

[SEAL]

Attest:

RUTH C. MASON  
*Attesting Officer*

C. MARSHALL DANN  
*Commissioner of Patents and Trademarks*